United States Patent Office 3,580,902
Patented May 25, 1971

3,580,902
WATER-INSOLUBLE MONOAZO DYESTUFFS
Hans-Joerg Angliker, Basel, Switzerland, assignor to Ciba Limited, Basel, Switzerland
No Drawing. Filed Oct. 4, 1967, Ser. No. 672,721
Claims priority, application Switzerland, Oct. 11, 1966, 14,691/66
Int. Cl. C09b 29/08, 29/36, 29/38
U.S. Cl. 260—207
4 Claims

ABSTRACT OF THE DISCLOSURE

Water-insoluble mono-azo dyestuff of the formula

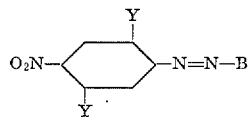

in which one of the symbols Y represents a phenoxy, phenyl-lower alkoxy, phenylmercapto, phenyl-lower alkylmercapto, phenyl nitrophenyl or phenyl-lower alkyl group and the other represents a hydrogen atom, a lower alkyl, lower alkoxy, phenylmercapto, phenyl-lower alkylmercapto phenyl or phenyl-lower alkyl group and B represents the radical of a coupling component selected from the group consisting of a pyrazolone, barbituric acid, 8-hydroxyquinoline and a compound of the formula

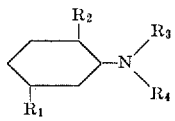

in which $R_1$ represents hydrogen, halogen, lower alkyl, lower alkoxy, lower alkanoylamino, phenoxy, phenylmercapto phenyl, $R_2$ represents hydrogen, lower alkyl or lower alkoxy, $R_3$ and $R_4$ each represents lower alkyl, cyano-lower alkyl, or lower alkanoyloxy-lower alkyl, dye polyester fibers yellow to red tints of excellent fastness to light and sublimation.

---

The present invention is based on the observation that new and valuable azo dyestuffs may be obtained when a diazo compound of an aminobenzene, which contains an aryloxy, aralkyloxy, arylmercapto, aralkylmercapto, aryl or aralkyl group attached to the benzene nucleus in addition to at least one substituent of the second order at ortho- and/or para-position to the amino group and in which not more than one aryloxy or aralkoxy group may be present, is coupled with a coupling component which is free from groups imparting solubility in water.

The diazo components to be used in accordance with the invention preferably contain those aryloxy, aralkoxy, arylmercapto, aralkylmercapto, aryl or aralkyl groups in which the aryl residue is a phenyl residue which may be substituted, for example, by halogen atoms or alkyl or alkoxy groups.

Substituents of the second order which may be mentioned are cyano, carboxylic acid ester, carboxylic acid amide, trifluoromethyl and especially nitro groups.

Diazo components which are of special interest are those of the formula

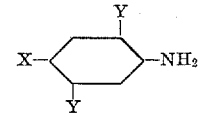

in which X represents a nitro, cyano, carboxylic acid ester, carboxylic acid amide, alkylsulphonyl or trifluoromethyl group, one of the symbols Y represents a phenoxy, phenalkoxy, phenylmercapto, phenalkylmercapto, phenyl or phenalkyl group and the other represents a hydrogen atom or an alkyl, alkoxy, phenylmercapto, phenalkylmercapto, phenyl or phenalkyl group or a substituent of the second order.

The following amines may be mentioned as examples:

1-amino-2-phenoxy-4-nitrobenzene,
1-amino-2-phenoxy-4-cyanobenzene,
1-amino-2-phenoxy-4-carbomethoxybenzene,
1-amino-2-para-chlorophenoxy-4-nitrobenzene,
1-amino-2-ortho-methylphenoxy-4-nitrobenzene,
1-amino-2-benzoyloxy-4-nitrobenzene,
1-amino-2-phenoxymercapto-4-nitrobenzene,
1-amino-2-benzylmercapto-4-nitrobenzene,
1-amino-2-phenyl-4-nitrobenzene,
1-amino-2-benzyl-4-nitrobenzene,
1-amino-2,5-di(phenylmercapto)-4-nitrobenzene,
1-amino-3-phenoxy-4-nitrobenzene,
1-amino-3-phenylmercapto-4-nitrobenzene,
1-amino-3-phenoxy-4-nitro-6-methylbenzene, and
1-amino-2-methoxy-4-nitro-5-phenoxybenzene.

The coupling components that may be used are primarily aminobenzenes which couple in para-position to the amino group or pyrazolones. Amines which are of special interest are those of the formula

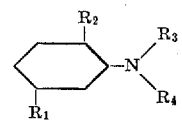

in which $R_1$ represents a hydrogen atom or an alkyl, acylamino, phenoxy, phenylmercapto or phenyl group, a trifluoromethyl group or a halogen atom, $R_2$ represents a hydrogen atom or an alkyl or alkoxy group and $R_3$ and $R_4$ each represents a hydrogen atom or an alkyl group, especially an ethyl group, which may be substituted, for example, by halogen atoms or hydroxy, alkoxy, cyanolkoxy, acyloxy, cyano, carbalkoxy or carbamide groups.
The following may be mentioned as examples:

niline,
-methylaniline,
-methyl-6-methoxyaniline,
-phenoxyaniline,
-methoxy-5-phenoxyaniline,
J-methylaniline,
J-ethylaniline,
J-cyanoethylaniline,
J-cyanoethoxyethylaniline,
J-cyanoethoxyethyl-5-acetylaminoaniline,
J-cyanoethoxyethyl-2-methoxy-5-acetylaminoaniline,
J,N-diethylaniline,
J,N-diethyl-3-methylaniline,
J,N-diethyl-2-methoxy-5-methylaniline,
J,N-diethyl-5-acetylaminoaniline,
J,N-diethyl-2-methoxy-5-acetylaminoaniline,
J,N-diethyl-2-methoxy-5-phenoxyaniline,
J-ethyl-N-cyanoethylaniline,
J-ethyl-N-cyanoethyl-3-methylaniline,
J-ethyl-N-cyanoethyl-2-methoxy-5-methylaniline,
J-ethyl-N-cyanoethyl-3-acetylaminoaniline,
J-ethyl-N-cyanoethyl-2-methoxy-5-acetylaminoaniline,
J-ethyl-N-cyanoethyl-3-phenoxyaniline,
J-ethyl-N-cyanoethyl-2-methoxy-5-phenoxyaniline,
J-ethyl-N-cyanoethyl-2-methoxy-5-phenylmercapto-
  aniline,
J-ethyl-N-acetoxyethylaniline,
J-ethyl-N-acetoxyethyl-3-methylaniline,
J-ethyl-N-acetoxyethyl-3-propionylaminoaniline,
J-ethyl-N-acetoxyethyl-3-phenoxyaniline,
J-ethyl-N-acetoxyethyl-2-methoxy-5-phenoxyaniline,
J-hydroxyethyl-N-cyanoethylaniline,
J-hydroxyethyl-N-cyanoethyl-3-methylaniline,
J-hydroxyethyl-N-cyanoethyl-3-acetylaminoaniline,
J,N-bis-hydroxyethyl-3-methylaniline,
J,N-bis-cyanoethylaniline,
J,N-bis-cyanoethyl-3-methylaniline,
J,N-bis-cyanoethyl-2-ethoxy-5-phenoxyaniline,
J,N-bis-acetoxyethylaniline,
J,N-bis-acetoxyethyl-3-methylaniline,
J,N-bis-acetoxyethyl-2-methoxy-5-methylaniline,
J,N-bis-acetoxyethyl-3-aminoaniline,
J,N-bis-acetoxyethyl-2-methoxy-5-acetylaminoaniline,
J,N-bis-acetoxyethyl-3-phenoxyaniline, and
J,N-bis-acetoxyethyl-2-methoxy-5-phenoxyaniline.

Pyrazolones which are of special interest are those of he formula

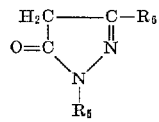

n which $R_5$ represents a hydrogen atom or an alkyl ir phenyl group and $R_6$ represents an alkyl or carbalkoxy roup. Examples are as follows: 3-acetylpyrazolone-5, 3-arbomethoxypyrazolone-5, 3-carboethoxypyrazolone-5, -phenyl-3-methylpyrazolone-5, 1-para-chlorophenyl-methylpyrazolone-5 and 1-(2′,5′-dichlorophenyl-3-nethylpyrazolone-5.

Diazotization of the diazo components may be carried ut by methods known per se, for example, with a mineral cid, especially hydrochloric acid, and sodium nitrite, or, or example, with a solution of nitrosyl-sulphuric acid in oncentrated sulphuric acid.

Coupling may also be carried out by known methods, or example, in a weakly alkaline or neutral to acid nedium, if necessary in the presence of sodium acetate or similar buffer which influences the rate of coupling, or catalyst, for example, pyridine, or a salt thereof.

After coupling, the dyestuffs formed can easily be sepa- ated from the coupling mixture, for example, by filtra- ion, because they are virtually insoluble in water.

The new products may be used, for example, as pigments, but more especially they are suitable for dyeing and printing materials, especially fibres and fabrics made, for example, of cellulose acetate and polyamides, but especially aromatic polyesters. They produce on these materials strong dyeings possessing excellent properties of fastness, especially excellent fastness to light, sublimation and rubbing.

For dyeing, the new dyestuffs are advantageously used in a state of fine division, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the finely divided dyestuff in a form such that a fine dispersion is obtained when the preparation is diluted with water. Such dyestuff preparation may be obtained in known manner, for example, by reprecipitating the dyestuff from sulphuric acid and grinding the suspension so obtained with sulphite cellulose waste liquor. If necessary, they may also be obtained by grinding the dyestuff in a highly efficient grinding device in the dry or wet state in the presence or absence of a dispersing agent.

To obtain stronger dyeings on polyethylene terephthalate fibres it is generally advantageous to add a swelling agent to the dyebath, or more especially to carry out the dyeing process under superatmospheric pressure at a temperature above 100° C., for example, at 120° C. Suitable swelling agents are aromatic carboxylic acids, for example, benzoic acid and salicylic acid; phenols, for example, ortho- or para-hydroxydiphenyl; aromatic halogen compounds, for example, chlorobenzene, ortho-dichlorobenzene and trichlorobenzene; and phenyl- or phenylmethylcarbinol or diphenyl. When carrying out the dyeing process under superatmospheric pressure it is generally advantageous to render the dyebath slightly acidic, for example, by the addition of a weak acid, for example, acetic acid.

By virtue of their fastness to alkali, the new dyestuffs are specially suitable for application by the so-called thermofixation process in which the material to be dyed is impregnated at a temperature not exceeding 60° C. with an aqueous dispersion of the dyestuff which advantageously contains 1 to 50% of urea and a thickening agent, especially sodium alginate, and then squeezed in the usual manner. The impregnated material is advantageously squeezed so as to retain 50 to 100% of its dry weight of dye-liquor.

To fix the dyestuff, the material so impregnated is heated to a temperature above 100° C., for example, to a temperature between 180 and 220° C., advantageously after drying, for example, in a current of warm air.

The aforementioned thermofixation process is specially suitable for the dyeing of union fabrics made from polyester fibres and cellulosic fibres, especially cotton. In this case, in addition to the dyestuffs of the invention, the padding liquor contains dyestuffs suitable for dyeing cotton, especially vat dyestuffs, or reactive dyestuffs, that is to say, dyestuffs capable of being fixed on the cellulosic fibre with formation of a chemical bond, for example, dyestuffs which contain a chlorotriazine or chlorodiazine residue. In the latter case, it is generally advantageous to add an agent capable of binding acid to the padding liquor, for example, an alkali metal carbonate, an alkali metal phosphate, an alkali metal borate or an alkali metal perborate, or mixtures thereof. When using vat dyestuffs, the padded fabric must be treated after the heat treatment with an aqueous alkaline solution of one of the reducing agents commonly used in vat dyeing.

By virtue of the fact that the dyestuffs of the invention reserve well on wool, they are eminently suitable for dyeing union fabrics made from polyester fibre and wool.

The dyeings obtained are advantageously subjected to an after-treatment, for example, by heating with an aqueous solution of a non-ionic detergent.

The dyestuffs may also be applied by printing processes. In this method of application a printing paste, for example, is used which contains the finely divided dyestuff together with the usual printing adjuvants, for example, thickening and wetting agents, if desired, in admixture with one of the abovementioned cotton dyestuffs and if necessary, urea and/or an agent capable of binding acid.

The following examples illustrate the invention. Unless otherwise stated, the parts and percentages are by weight.

EXAMPLE 1

2.3 parts of 1-amino-2-phenoxy-4-nitrobenzene are dissolved in 45 parts of glacial acetic acid and the solution so obtained is added dropwise at a temperature of 15 to 20° C. to a solution of 0.7 parts of $NaNO_2$ in 10 parts of sulphuric acid, to which solution 15 parts of glacial acetic acid have already been added. After diazotization, the excess of nitrite is destroyed and the solution is added dropwise at a temperature of 0–10° C. and at a pH value between 7 and 8 to a solution of 1.8 parts of 1-phenyl-3-methylpyrazolone-5 in 150 parts of alcohol. Stirring is continued till coupling is complete and then the dyestuff is isolated by filtration, washed with water and dried in vacuo. It dyes polyester fibres yellow shades possessing excellent fastness to light and sublimation.

Dyeing procedure 1 part of the dyestuff obtained in the manner described in this example is ground wet together with 2 parts of a 50% aqueous solution of the sodium salt of 1,1'-dinapthyl-methane-2-2'-disulphonic acid and the batch is dried.

The dyestuff preparation so obtained is mixed with 40 parts of a 10% aqueous solution of the sodium salt of N-benzyl-$\mu$-heptadecylbenzimidazole disulphonic acid and then 4 parts of a 40% acetic acid solution are added. A dyebath of 4,000 parts is prepared therefrom by dilution with water.

100 parts of cleaned polyester fibre material are entered into this dyebath at 50° C., the temperature is raised to 120 to 130° C. within half an hour and dyeing is carried out for one hour at that temperature in a closed vessel. The material is then well rinsed. A strong yellow dyeing possessing excellent fastness to light and sublimation is obtained.

EXAMPLE 2

A dyestuff which dyes polyester fibres yellow shades possessing excellent fastness to light and sublimation is obtained by replacing the 1.8 parts of 1-phenyl-3-methylpyrazolone-5 used in Example 1 with 1 part of 3-methylpyrazolone-5.

EXAMPLE 3

2.3 parts of 1-amino-2-phenoxy-4- nitrobenzene are dissolved in 45 parts of glacial acetic acid and the solution so obtained is added dropwise at a temperature of 15 to 20° C. to a solution of 0.7 part of $NaNO_2$ in 10 parts of sulphuric acid, to which solution 15 parts of glacial acetic acid have already been added. After diazotization, the excess of nitrite is destroyed and the solution is added dropwise at a temperature of 0–10° C. to a solution of 2 parts of N,N-bis-$\beta$-cyanoethylaniline in 150 parts of 80% acetic acid. The batch is stirred for six hours, buffered with 30% NaOH, stirred again for some time, and then the dyestuff is isolated by filtration, washed well, and dried in vacuo. It dyes polyester fibres orange shades possessing excelent fastness to light and sublimation.

The following table lists components from which further dyestuffs may be obtained by coupling the diazo components in column I with the coupling components listed in column II. The shades obtained on polyester fibres are indicated in column III.

| | I | II | III |
|---|---|---|---|
| 4 | 1-amino-2-phenoxy-4-nitrobenzene | N,N-bis-cyanoethyl-3-methylaniline | Orange. |
| 5 | do | N-cyanoethyl-N-acetoxyethylaniline | Do. |
| 6 | do | N,N-bis-acetoxyethylaniline | Scarlet. |
| 7 | do | N,N-bis-acetoxyethyl-3-methylaniline | Red. |
| 8 | do | N,N-bis-acetoxypropylaniline | Scarlet. |
| 9 | do | di-propionic acid ester of N-bis-hydroxyethyl-aniline. | Do. |
| 10 | do | N-cyanoethyl-2-methoxy-5-phenoxyaniline | Red. |
| 11 | do | N,N-bis-acetoxyethyl-2-methoxy-5-phenoxyaniline. | Do. |
| 12 | 2-(para-nitrophenyl)-4-nitroaniline | 1-phenyl-3-methylpyrazolone | Yellow. |
| 13 | do | N-bis-$\beta$-cyanoethylaniline | Orange. |
| 14 | 3-phenylmercapto-4-nitroaniline | 1-phenyl-3-methylpyrazolone | Yellow. |
| 15 | 2-chloro-4-nitro-5-thiophenoxy-aniline. | do | Do. |
| 16 | 2-phenoxy-4-nitroaniline | Barbituric acid | Do. |
| 17 | do | 8-hydroxyquinoline | Brown. |
| 18 | 2-methoxy-4-nitro-5-phenylaniline | 1-phenyl-3-methylpyrazolone | Yellow. |
| 19 | 2-methoxy-4-nitro-5-phenoxyaniline | N-bis-$\beta$-cyanoethylaniline | Orange. |
| 20 | 3-phenoxy-4-nitroaniline | do | Do. |
| 21 | 2-phenoxy-4-nitroaniline | Aniline | Scarlet. |

NOTE.—Dyestuff No. 17 also shows good affinity for polypropylene fibres containing nickel.

PREPARATION OF THE DIAZO COMPONENTS

Method I.—3-phenylmercapto-4-nitroaniline 17.25 parts of 3-chloro-4-nitroaniline are dissolved in 150 parts by volume of dimethylsulphoxide; 10.4 parts by volume of thiophenol are added, the batch is heated to 70° C. and then 20 parts of 30% NaOH are added dropwise. The batch is stirred overnight at 86 to 90° C. It is then discharged on to about 300 parts of ice, the product is isolated by filtration, washed until the washings run neutral and then dried in vacuo at 80° C. Recrystallization from ethanol yields the product of the formula

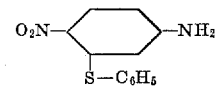

*Analysis.*—Calculated (percent): C, 58.52; H, 4.09; S, 13.02. Found (percent): C, 58.2; H, 4.3; S, 13.2.

Method II.—2-chloro-4-nitro-5-phenylmercaptoaniline

By replacing the 17.25 parts of 3-chloro-4-nitroaniline used in Method I with 20.7 parts of 2,5-dichloro-4-nitroaniline, a product of the formula

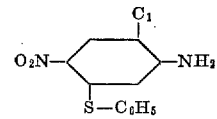

is obtained.

Method III.—3-phenoxy-4-nitroaniline

By replacing the 10.4 parts by volume of thiophenol used in Method I with 12 parts of phenol, a product of the formula

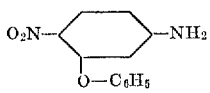

is obtained.

Method IV.—2-(para-nitrophenyl)-4-nitroaniline (a) 33.8 parts of 2-aminodiphenyl are acylated with acetic anhydride.

(b) 75 parts of monohydrate are cooled to 5° C. 10.55 parts of 2-phenylacetylaniline are added, the batch is stirred for 30 minutes, cooled to −10° C. and then 14 parts of mixed acid are added dropwise at that temperature. The batch is then stirred for 30 minutes, discharged into iced water, filtered, and the residue is triturated with very dilute ammonia. The product is then isolated by filtration and washed until the washings run neutral.

(c) The moist product is de-actylated in alcohol in the presence of a small amount of hydrochloric acid. A product of the formula

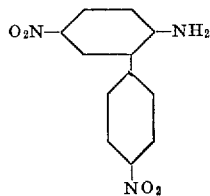

is obtained.

The position of the nitro group was determined by means of NMR spectroscopy.

Method V.—2-phenoxy-4-nitroaniline (a) 185.23 parts of 2-phenoxyaniline are acylated with acetic anhydride.

(b) 113.5 parts of finely powdered 2-phenoxyacetylaniline are introduced into 224 parts by volume of 63% $HNO_3$ at a temperature of 20 to 25° C. 64 parts by volume of 96% $HNO_3$ are then added dropwise at a temperature of 15 to 20° C., the batch is stirred for 15 minutes, 100 parts of iced water are added dropwise and the whole is stirred for 2½ hours. The batch is then filtered, the residue is triturated with very dilute ammonia, again filtered and the filter residue is washed until the washings run neutral.

(c) The moist product is de-acetylated in aqueous sulphuric acid. The product of the formula

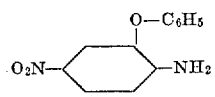

is obtained.

Method VI.—2-methoxy-4-nitro-5-phenoxyaniline (a) 21.5 parts of 2-methoxy-5-phenoxyaniline are acetylated with acetic anhydride.

(b) 12.85 parts of 2-methoxy-5-phenoxyacetylaniline are suspended in 100 parts by volume of glacial acetic acid. The suspension is cooled to 15° C. and 50 parts by volume of $HNO_3$ (d.=1.402) are added dropwise, the temperature being kept at between 15 and 20° C. The batch is then stirred for 3 hours at the same temperature, 100 parts of water are added dropwise, stirring is continued for 30 minutes and the batch is then filtered. The residue is triturated with very dilute ammonia, isolated by filtration, washed until the washings run neutral, dried, and then recrystallized from toluene.

(c) The product obtained in the manner described under (b) is de-acetylated in ethanol in the presence of a small amount of hydrochloric acid. After recrystallization from ethanol, a product of the formula

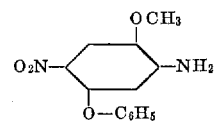

is obtained.

*Analysis.*—Calculated (percent): C, 59.99; H, 4.65; N, 10.77. Found (percent): C, 59.9; H, 4.8; N, 10.9.

Method VII.—2-methoxy-4-nitro-5-phenylaniline

By replacing the 21.5 parts of 2-methoxy-5-phenoxyaniline used in Method VI with 19.9 parts of 2-methoxy-5-phenylaniline, a product of the formula

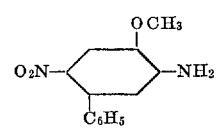

is obtained.

*Analysis.*—Calculated (percent): C, 63.92; H, 4.95; N, 11.47. Found (percent): C, 63.9; H, 5.1; N, 11.3.

What is claimed is:

1. A water-insoluble mono-azo dyestuff of the formula

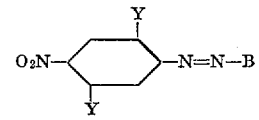

in which one of the symbols Y represents phenoxy, phenyl-lower alkoxy, phenylmercapto, phenyl-lower alkylmercapto, phenyl, nitrophenyl or phenyl-lower alkyl and the other represents hydrogen, lower alkyl, lower alkoxy, phenylmercapto, phenyl-lower alkylmercapto phenyl or phenyl-lower alkyl and B represents the radical of a coupling component selected from the group consisting of [1-phenyl-3-methyl pyrazolone,] barbituric acid, 8-hydroxyquinoline and a compound of the formula

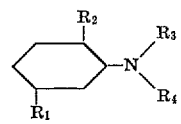

in which $R_1$ represents hydrogen, chlorine, lower alkyl, lower alkoxy, lower alkanoylamino, phenoxy, phenylmercapto or phenyl, $R_2$ represents hydrogen, lower alkyl or lower alkoxy, $R_3$ and $R_4$ each represents lower alkyl, cyano-lower alkyl, or lower alkanoyloxy-lower alkyl.

2. A water-insoluble mono-azo dyestuff as claimed in claim 1 of the formula

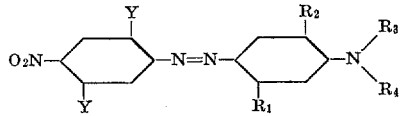

in which one of the symbols Y represents phenoxy, phenyl-lower alkoxy, phenylmercapto, phenyl-lower alkylmercapto, phenyl, nitrophenyl or phenyl-lower alkyl and the other represents hydrogen, lower alkyl, lower alkoxy, phenylmercapto, phenyl-lower alkylmercapto, phenyl or phenyl-lower alkyl, $R_1$ represents hydrogen, chlorine, lower alkyl, lower alkoxy, lower alkanoylamino, phenoxy, phenylmercapto or phenyl, $R_2$ represents hydrogen, lower alkyl or lower alkoxy, $R_3$ and $R_4$ each represents lower alkyl, cyano-lower alkyl, or lower alkanoyloxy-lower alkyl.

3. The dyestuff as claimed in claim 1 of the formula

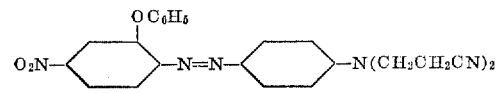

4. The dyestuff as claimed in claim 1 of the formula

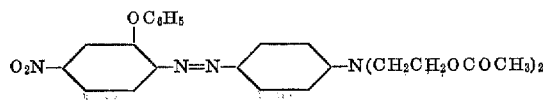

References Cited
UNITED STATES PATENTS

| | | | |
|---|---|---|---|
| 1,027,132 | 5/1912 | Kahn et al. | 260—206 |
| 1,821,255 | 9/1931 | Brightman | 260—162 |
| 1,986,801 | 1/1935 | Ellis | 260—206 |
| 2,009,063 | 7/1935 | Laska et al. | 260—206X |
| 2,010,884 | 8/1935 | Olpin et al. | 260—206X |
| 2,204,607 | 6/1940 | McNally et al. | 260—206 |
| 2,234,283 | 3/1941 | Saunders | 260—206X |
| 2,241,247 | 5/1941 | Dickey | 260—206 |
| 2,286,795 | 6/1942 | Dickey et al. | 260—207.1 |
| 3,268,507 | 8/1966 | Kruckenberg | 260—207 |

FLOYD D. HIGEL, Primary Examiner

U.S. Cl. X.R.

8—27, 41, 50, 71; 106—288; 117—138.8, 143; 260—154, 155, 162, 205, 206, 207.1, 310, 571, 578

PO-1050
(5/69)

UNITED STATES PATENT OFFICE
CERTIFICATE OF CORRECTION

Patent No. 3,580,902            Dated May 25, 1971

Inventor(s) Hans-Joerg Angliker

It is certified that error appears in the above-identified patent and that said Letters Patent are hereby corrected as shown below:

Column 8, claim 1, line 8 below the first structural formula, delete "[1-phenyl-3-methyl pyrazolone,]".

Signed and sealed this 11th day of January 1972.

(SEAL)
Attest:

EDWARD M. FLETCHER, JR.        ROBERT GOTTSCHALK
Attesting Officer                Acting Commissioner of Patents